US012275501B1

(12) United States Patent
Henry et al.

(10) Patent No.: US 12,275,501 B1
(45) Date of Patent: Apr. 15, 2025

(54) SPAR TRANSMITTER

(71) Applicant: HRL Laboratories, LLC, Malibu, CA (US)

(72) Inventors: Christopher P. Henry, Thousand Oaks, CA (US); Walter S. Wall, Calabasas, CA (US); Carson R. White, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 18/652,611

(22) Filed: May 1, 2024

Related U.S. Application Data

(62) Division of application No. 17/018,870, filed on Sep. 11, 2020, now Pat. No. 12,012,184.

(60) Provisional application No. 62/964,072, filed on Jan. 21, 2020.

(51) Int. Cl.

| | |
|---|---|
| ***B63B 35/44*** | (2006.01) |
| ***H01Q 1/04*** | (2006.01) |
| ***H01Q 1/30*** | (2006.01) |
| ***H01Q 1/34*** | (2006.01) |
| ***H01Q 9/36*** | (2006.01) |

(52) U.S. Cl.
CPC ............... *B63B 35/44* (2013.01); *H01Q 1/04* (2013.01); *H01Q 1/30* (2013.01); *H01Q 1/34* (2013.01); *H01Q 9/36* (2013.01); *B63B 2035/442* (2013.01)

(58) Field of Classification Search
None
See application file for complete search history.

(56) References Cited

U.S. PATENT DOCUMENTS

| | | | | | |
|---|---|---|---|---|---|
| 3,946,391 | A | | 3/1976 | Cuckler | |
| 4,335,469 | A | | 6/1982 | Tharp et al. | |
| 4,353,071 | A | * | 10/1982 | Bernstein | H01Q 1/087 343/709 |
| 4,606,673 | A | | 8/1986 | Daniell | |
| 5,577,942 | A | * | 11/1996 | Juselis | B63B 22/18 367/4 |
| 5,654,692 | A | * | 8/1997 | Baxter, Jr. | G08B 21/16 340/623 |
| 6,102,758 | A | * | 8/2000 | Smith | B63B 22/00 441/1 |
| 6,980,228 | B1 | * | 12/2005 | Harper | B63B 22/16 348/81 |

(Continued)

OTHER PUBLICATIONS

From U.S. Appl. No. 17/018,870 (now published as U.S. Pat. No. 12,012,184), office action mailed on Sep. 28, 2022.

(Continued)

*Primary Examiner* — Dameon E Levi
*Assistant Examiner* — Anh N Ho
(74) *Attorney, Agent, or Firm* — Ladas & Parry, LLP

(57) ABSTRACT

A spar buoy for very low frequency (VLF) or low frequency (LF) transmission including a first portion of the spar buoy extending above a mean water line including a conductive structure including a coaxial feed, and an antenna coupled to the coaxial feed and extending above the conductive structure, and a second portion of the spar buoy below the mean water line including a transmitter coupled to the coaxial feed, an energy storage subsystem coupled to the transmitter and an electric power generation subsystem coupled to the energy storage subsystem.

9 Claims, 7 Drawing Sheets

(56) References Cited

U.S. PATENT DOCUMENTS

| | | | | |
|---|---|---|---|---|
| 7,243,609 | B1 | 7/2007 | Ansay | |
| 8,242,621 | B1 * | 8/2012 | Tate | B63B 22/18 417/331 |
| 8,493,355 | B2 | 7/2013 | Geaghan et al. | |
| 8,593,355 | B1 | 11/2013 | Tonn | |
| 9,233,733 | B2 | 1/2016 | Bein et al. | |
| 9,315,243 | B2 * | 4/2016 | Richter-Menge | B63B 22/24 |
| 9,407,000 | B1 * | 8/2016 | Willistein | H01Q 1/30 |
| 11,539,119 | B1 * | 12/2022 | Wall | H01Q 1/30 |
| 12,012,184 | B1 | 6/2024 | Henry et al. | |
| 2018/0097531 | A1 | 4/2018 | Kummaraguntla | |
| 2019/0203689 | A1 | 7/2019 | Sheldon-Coulson | |
| 2020/0056578 | A1 | 2/2020 | Sheldon-Coulson | |

OTHER PUBLICATIONS

Notice of Allowance in U.S. Appl. No. 17/018,870, filed Sep. 11, 2020, mailed on Feb. 14, 2024.

Office Action in U.S. Appl. No. 17/018,870, filed Sep. 11, 2020, mailed on Jan. 18, 2023.

Office Action in U.S. Appl. No. 17/018,870, filed Sep. 11, 2020, mailed on Apr. 28, 2023.

Office Action in U.S. Appl. No. 17/018,870, filed Sep. 11, 2020, mailed on Jul. 5, 2023.

Office Action in U.S. Appl. No. 17/018,870, filed Sep. 11, 2020, mailed on Dec. 28, 2023.

* cited by examiner

SPAR TRANSMITTER

CROSS-REFERENCE TO RELATED APPLICATIONS

This application is a divisional of U.S. patent application Ser. No. 17/018,870, filed on Sep. 11, 2020, which is related to and claims the benefit of U.S. Provisional Patent Application No. 62/964,072, filed on Jan. 21, 2020, which is incorporated herein by reference as though set forth in full.

STATEMENT REGARDING FEDERAL FUNDING

This invention was made under U.S. Government contract N66001-19-C-4018. The U.S. Government may have certain rights in this invention.

TECHNICAL FIELD

This disclosure relates to very low frequency (VLF) and low frequency (LF) antennas and transmitters.

BACKGROUND

Prior art VLF transmitters used for command and control of submerged platforms are large monolithic structures, requiring massive size and operational costs to achieve their mission. These systems also typically rely on propagation off the ionosphere and consequently broadcast signals over extremely large areas, making transmit signals relatively easy to intercept.

A variety of prior art VLF transmitter architectures have been proposed and investigated. The most common type of architecture is a large ground based station, such as the Cutler station in Maine. Typically these VLF transmitters are constructed of one or a few very large top-loaded monopole structures designed to couple energy into the earth-ionosphere waveguide (EIW) and provide VLF coverage over large sections of the earth. At VLF frequencies and lower, electromagnetic waves can travel to reception depths of 10 m to 30 m unmanned underwater vehicles and submarine communications. Direct underwater VLF transmission has much greater attenuation than in-air transmission and does not have the benefit of coupling energy into the EIW to enhance the communications coverage. Therefore, transmitters with in-air antennas have much improved areal communications coverage compared to direct VLF propagation underwater. Thus, as further described below, the present disclosure describes a spar buoy with an in-air antenna for increased communications coverage.

Another prior art transmitter architecture described in U.S. Pat. No. 4,335,469, issued Jun. 15, 1982, which is incorporated herein by reference, utilizes a long wire antenna trailing behind an airplane to achieve VLF transmission from a single mobile platform. Yet another VLF transmitter architecture employs aerostats and consists of a ground based VLF source feeding a long conductor supported by a lighter than air object such as an aerostat or balloon. Yet another VLF architecture is the NASA tethered satellite system (TSS) which was intended to string a long conductor between two satellites to enable VLF/ELF transmission from orbit.

U.S. Pat. No. 9,233,733, issued Jan. 12, 2016, which is incorporated herein by reference, describes a mast stabilizing device to counteract large surface vehicle motions or rotations associated with high sea state waves and winds. It has a mass at the bottom of the mast in the water, and a spring attached to a buoy to act as a spring-mass-damper system to limit mast motions and to help the mast maintain a substantially vertical orientation desired in vertical antenna applications.

Also in the prior art are wave based power generators, such as the MARMOK-A-5, which is a device generating relatively low power (30 kW), while having dimensions of five meters in diameter and forty-two meters in height. The device weighs approximately 80 tons.

What is needed are improved VLF and LF antennas and transmitters that enable transmission of signals under the surface of water and over a contained area without needing transmitters of massive size and power. The embodiments of the present disclosure answer these and other needs.

SUMMARY

In a first embodiment disclosed herein, a spar buoy for very low frequency (VLF) or low frequency (LF) transmission comprises a first portion of the spar buoy extending above a mean water line comprising a conductive structure comprising a coaxial feed, and an antenna coupled to the coaxial feed and extending above the conductive structure, and a second portion of the spar buoy below the mean water line comprising a transmitter coupled to the coaxial feed, an energy storage subsystem coupled to the transmitter, and an electric power generation subsystem coupled to the energy storage subsystem.

In another embodiment disclosed herein a system for very low frequency (VLF) or low frequency (LF) transmission comprises a spar buoy, an air vehicle, a first portion of the spar buoy extending above a mean water line comprising a conductive structure comprising a coaxial feed, and a conductive cable coupled to the coaxial feed and coupled to the air vehicle, and a second portion of the spar buoy below the mean water line comprising a transmitter coupled to the coaxial feed, an energy storage subsystem coupled to the transmitter, and an electric power generation subsystem coupled to the energy storage subsystem.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1:
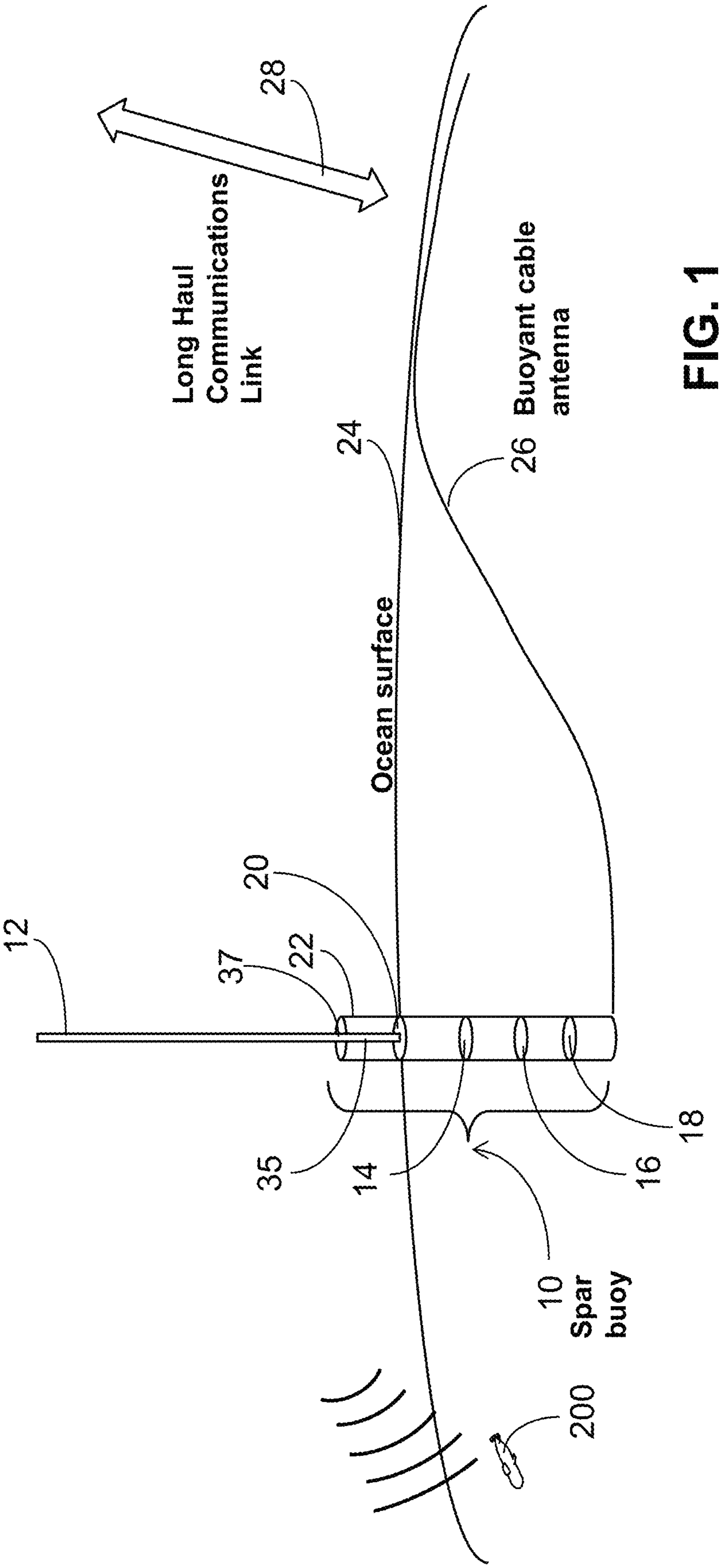
FIG. 1 shows a spar type transmitting buoy in accordance with the present disclosure.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes a spar buoy with a coax fed monopole antenna which may have a various lengths needed for communications in the very low frequency (VLF) band (3 kHz to 30 kHz) or low frequency (LF) band (30 kHz to 300 kHz). For a mast antenna desired for transmission in the LF band, the antenna may have a length of up to 120 meters (m). In one embodiment the antenna may have a length of 20 m. The antenna may also be a lofted antenna, which is supported aloft by an air vehicle for transmission in the VLF band. If the air vehicle is an aerostat, the antenna may have a length up to 10,000 meters. If the air vehicle is an airplane, drone, parafoil, or a helicopter/quadcopter, because of the more limited weight that can be supported by such an air vehicle, the antenna may have a length up to 1,000 meters. A length of 30 km corresponds to the wavelength of the lowest very low frequency (VLF).

The antenna feed is configured to be mounted at a mean water line inside a tubular type platform or spar buoy configured for open ocean operation. The mean water line is determined by the buoyancy of the buoy. There can be a change in the mean water line of the buoy with a decrease in fuel; however, as fuel is consumed, ballast water may be added to the buoy to counteract any change in the buoyancy, which is a common technique, for example, used by submarines to maintain depth. Mounting the monopole antenna at a deeper location would aid in maintaining stability but would compromise the antenna's electrical performance.

The buoy is configured to allow the coaxial feed to extend out the top into the atmosphere. The monopole antenna may be a mast, tower, or a conductive cable supported by an aerial vehicle.

The spar-buoy has a substantially deep underwater section and a section extending above the water surface which is designed to prevent water ingress into the buoy in adverse wave and weather conditions. To help in-water stability of the buoy, and to reduce onboard fuel and power requirements, a water column oscillator power generator may be mounted at the bottom of the buoy. A non-conductive sealing cap may be located over the output of the coaxial feed to the antenna to allow the inner volume of the coaxial feed to be evacuated or filled with a gas to prevent electrical breakdown in the feed and improve power handling. A horn may be used for the antenna feed to smooth the impedance transition into the air and help suppress voltage breakdown. The depth of the antenna feed decreases somewhat, but not significantly, the overall exposed length or height of the antenna above the water-line.

To assist in the ballasting of the spar, a tethered mass or an equipment torus/donut may be placed low on the spar buoy to stabilize the buoy in adverse open ocean conditions and stabilize the antenna in a preferred vertical orientation. As discussed above, a traditional ballasting method can be used to maintain a specific water-line.

The spar buoy deep-draft floating chamber, or hollow cylindrical hull, may be encircled with spiraling strakes to add vertical stability in open ocean conditions.

Unlike, traditional VLF transmitters, which use a small number of very large transmitters, the present invention describes a transmitter architecture which may be employed in an alternative architecture with a large number of distributed, coordinated, and electrically small or relatively low power transmitters on independent autonomous platforms. Unlike the prior art, this approach enables mobility and improved control of VLF coverage as well as reduced transmitter power.

FIG. 1 shows a spar buoy 10 with an antenna 12, which in the embodiment of FIG. 1 is a conductive mast. The spar buoy may be used for communications to and from a submarine 200, as shown in FIG. 1.

To achieve vertical stability for the tall antenna 12, the bulk of the mass of the spar buoy 10 is preferably concentrated in the lower half of the spar buoy 10, which is mostly below the water line 24. In the configuration of the spar buoy shown in FIG. 1, this lower half of the spar buoy 10 may include the following subsystems: an energy storage subsystem 14, which may include a battery and fuel, which may be used to power electronics and for propulsion; a transmitter and electronics subsystem 16, which may include a transmitter, position and motion sensors, and signal control and communication electronics; and an electric power generation subsystem 18, which may generate power from ocean waves or generate power in other ways, such as an electricity generator that uses fuel stored in the energy storage subsystem 14. The position of these subsystems as shown in FIG. 1 is only an example. The subsystems are preferably arranged so as to lower the center of gravity of the spar buoy 10 for stability.

As shown in FIG. 1, the feed location 20 for the antenna 12 is at the mean water line 24 of the ocean or water surface. A conductive outer structure 22 extends above the mean water line 24 and surrounds the part of the antenna 12 that is within the conductive outer structure 22. The conductive outer structure 22 is conductive to provide an electrical grounding connection to the surrounding water and to prevent water ingress to the high voltage feed 35, shown in FIG. 2, which could cause shorting and flash-over damage to the transmitter and other electronics in the buoy.

A buoyant cable antenna 26, such as that described in U.S. Pat. No. 8,593,355, Nov. 26, 2013, which is incorporated herein by reference, may be connected to the transmitter and electronics subsystem 16 on the spar buoy 10 to enable a remote operator or system to send, via a long haul communications link 28 or similar communication links, commands and messages to the spar buoy 10. The messages may then be transmitted via the antenna 12. The buoyant cable antenna may also be used to allow the spar buoy 10 to function in a communication network as a relay or router of commands and messages to other spar buoys 10 or to other devices.

Figure 2:
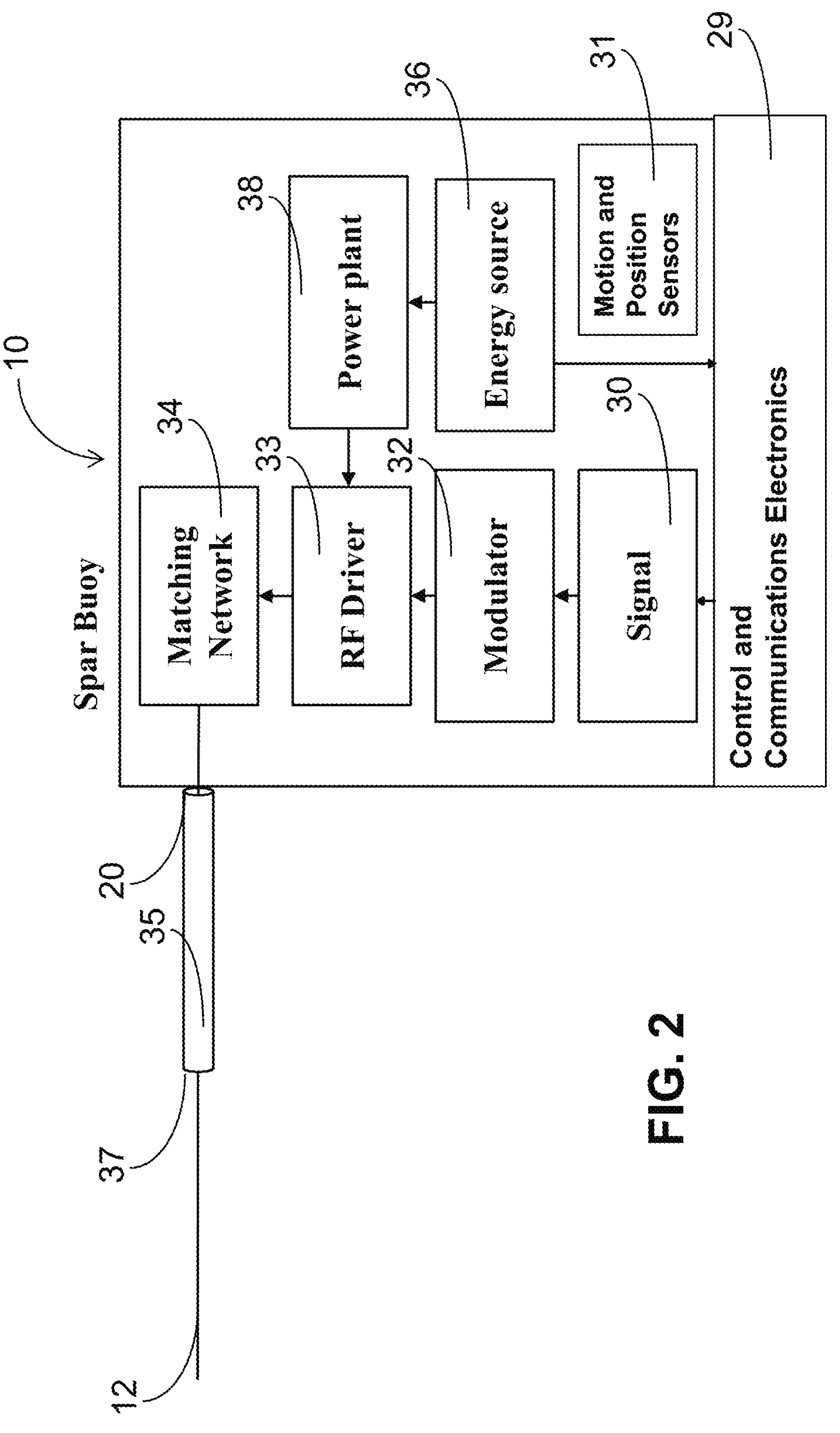
FIG. 2 shows a block diagram of transmitter elements in the buoy in accordance with the present disclosure.

FIG. 2 shows elements of the subsystems in the spar buoy 10. The control and communications electronics 29 may be coupled to the buoyant cable antenna 26 for receiving commands and messages via the long haul communications link 28 or via some other local communications link. The commands and messages may be processed by the control and communications electronics to derive a signal 30 for transmission. The signal 30 may be modulated by modulator 32 for VLF or LF transmission and driven by radio frequency (RF) driver 33 via matching network 34 and coaxial feed 35 into the antenna 12. A high voltage is generated in the coaxial feed 35. The transmitter may include the modulator 32, the RF driver 33 and the matching network 34. The energy source 36 and power plant 38 operate to provide electric power to the transmitter. The energy source 36 and power plant 38 may include a battery, stored fuel, an electric power generator, or a device for generating power from ocean waves. The power provided or generated provides power for the transmitter and electronic subsystem 16 in the spar buoy 10. The power may also be used for propulsion of the spar buoy 10, which may be used for station keeping or for repositioning of the spar buoy 10. As shown in FIG. 2, the spar buoy 10 may include motion and position sensors 31, which may include global positioning satellite (GPS) receivers and gyroscopes, to assist in station keeping and/or repositioning of the buoy.

As shown in FIG. 1, the antenna 12 may be a monopole antenna and may be a conductive rigid tower or rigid mast 12. A similar antenna 12 is also shown for the spar buoy configurations shown in FIGS. 4 and 6. The antenna 12 is preferably supported by the spar buoy 10 above the water line 24 when the water surface is calm. The antenna 12 is conductive and may be metallic to provide structural integrity. The output 37 of the coaxial feed 35 to the antenna 12 is preferably located above the water line 24. However, the output 37 can be located below the water line 24 at the expense of reduced antenna efficiency due to conductive losses in the radiating structure.

Figures 3A, 3B:
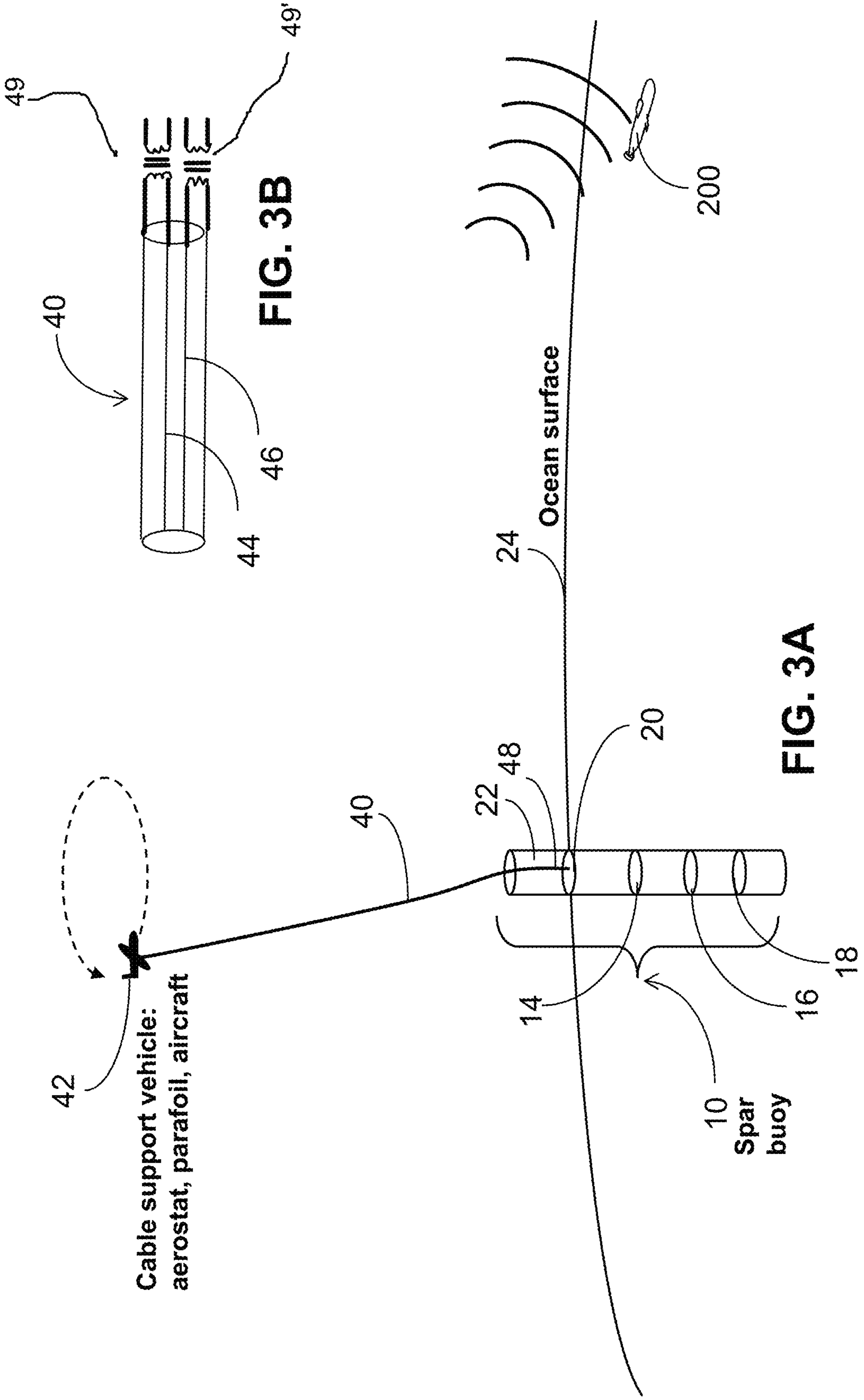
FIG. 3A shows a spar transmitter with a tether antenna cable supported by an aerial vehicle, which may be an autonomous airplane, drone, helicopter/quadcopter, aerostat or parafoil that is powered and controlled via separate cables in the tether as shown in FIG. 3B in accordance with the present disclosure.

FIG. 3A shows an alternative to the mast antenna 12 shown in FIG. 1. In FIG. 3A, the antenna is a lofted antenna, which is a conductive cable 40 tethered to and supported by an air vehicle 42. The air vehicle 42 may be a manned or autonomous airplane, a drone, an aerostat, a parafoil or a helicopter/quadcopter. The air vehicle 42 may be powered and controlled via a power cable 44 and a control cable 46, respectively, which run from the spar buoy 10 to the air vehicle 42. The power cable 44 and control cable 46 may be inside the conductive cable 40, as shown in FIG. 3B, or alongside the conductive cable 40. The air vehicle 42 trajectory is preferably controlled so that the antenna cable 40 is kept as straight and as vertical as possible given different environmental and wave conditions.

The conductive cable 40 and the power 44 and control 46 cables may be 1000 meters to 10,000 meters long. If the air vehicle is an aerostat then the conductive cable may be 10 m000 meters long, because an aerostat can support the weight of a long conductive cable 40, and the power 44 and control 46 cables. However, if the air vehicle 42 is an airplane, drone, parafoil or helicopter/quadcopter, and the spar buoy 10 supplies the power to the air vehicle, then because the power required is large and the added current that must be sent on the power cable 44 is high, the weight of the conductive cable 40 and the power 44 and 46 cables limits the length of the cables. For a configuration with an air vehicle 42 that is an airplane, drone, parafoil, or a helicopter/quadcopter, the maximum length for the conductive cable 40, the power cable 44 and the control cable 46 is estimated to be 1000 meters. Cable handling equipment, such as winches, may efficiently stow the cables in a compact volume inside the spar buoy.

An isolation transformer 49 may be included at the base 48 of the conductive cable 40 for direct current isolation of the VLF transmitter and RF transmission feed 20 from the aerial vehicle 42. Also, another isolation transformer 49' may be used to isolate direct current on the power cable 44 and the control cable 46 from the aerial vehicle 42.

Figure 4:
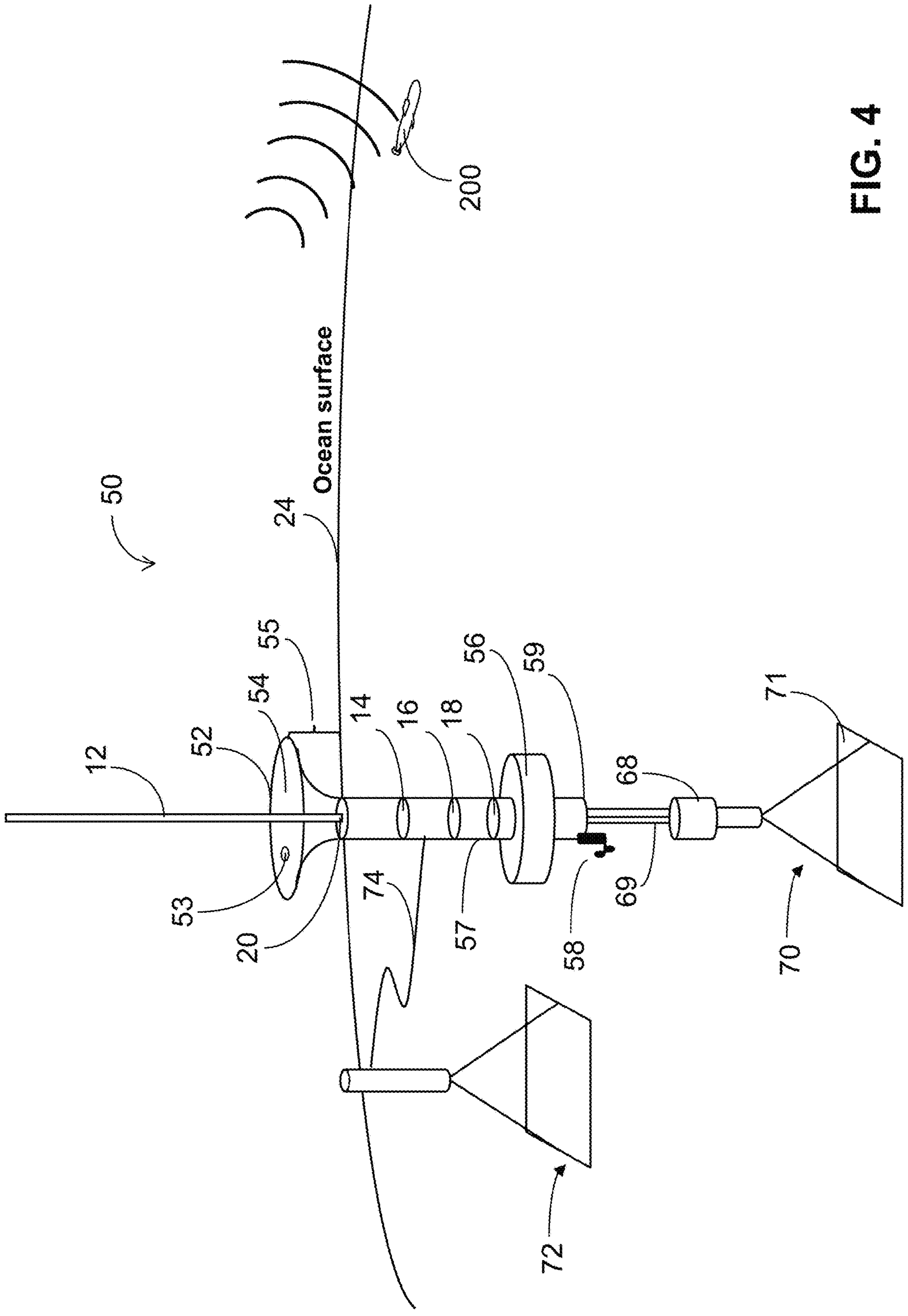
FIG. 4 shows a spar type transmitting buoy including a horn from the feed location into the atmosphere, a non-conductive sealing cap that helps contain gases with voltage breakdown strengths greater than air, torus arrangements for equipment that offset the high mass moment of inertia created by a tall antenna, propulsion that can be attached near the center of mass or at the bottom of the spar buoy for station keeping or for moving the buoy, ballast, and an energy generator, either bottom mounted or detached with a power cable tether in accordance with the present disclosure.

FIG. 4 shows another embodiment of a spar buoy 50 with a number of optional elements that may enhance the functionality or robustness of the VLF or LF transmitter.

A high voltage is generated in the coaxial feed 35 and therefore may create an impedance discontinuity at the feed location 20, which may be a challenge for the matching network 34. In the embodiment of FIG. 4 a horn 52 with flared edges is used instead of the conductive outer structure 22 shown in FIG. 1. The horn 52 flares from the spar at the feed location 20 into the atmosphere to smooth the impedance transition into the air and help suppress voltage breakdown. At the feed location 20, the diameter of the horn 52 may be the same as the diameter of the spar buoy at that location, then the diameter of the horn 52 flares to a larger diameter.

To further improve voltage breakdown suppression, a a non-conductive sealing cap 54 may sealed over the top of the horn 52 in order to contain an inert gas in the volume 55 between the antenna feed 20 and the top of the horn 52. The gas may be $SF_6$, dry $N_2$, or a vacuum, which each have a higher dielectric/voltage breakdown strength compared to air. Instead of a gas, a dielectric liquid, such as silicone oil or mineral oil, may be used in the volume 55 between the antenna feed 20 and the top of the horn 52. The non-conductive sealing cap 54 includes a mechanism, such as a valve 53, to allow gas or liquid to be installed or evacuated from the volume 55. The non-conductive sealing cap 54 also helps prevent water ingress into the spar buoy.

To assist with the proper vertical mass distribution in the spar buoy, equipment or fuel may be placed in a torus 56 around the perimeter 57 of the spar buoy. The torus 56 may be a sealed compartment removably secured to the spar buoy with a power cable feed into the spar buoy, or the torus may be permanently attached or welded to the spar buoy.

One or more propulsion devices or propulsors 58 may be attached to a side wall or the spar buoy or a truss appendage of the spar buoy. The propulsion devices 58 may be configured to perform station keeping in order to resist motion and rotation under wave and wind action. Further the propulsion devices 58 can be oriented in the direction of water current with control surfaces and propulsors oriented to minimize spar buoy yaw and pitch motions. The propulsion device 58 may also be used to geographically reposition the spar buoy.

As shown in FIG. 4, the spar buoy may also include a ballast mass 68 capable of offsetting the high mass moment of inertia of the tall mast antenna 12. The ballast mass 68 may be deployable on a truss or a cable 69 that can unspool from the submerged spar buoy base 59.

A wave energy generator 70, which may be a column oscillator power generator including a planform 71, may be mounted at the base 59 of the spar buoy or below the ballast mass 68 to provide power. Alternatively, power may be provided by a free floating wave energy generator 72 adjacent to the spar buoy with an electrical power conduit 74 connecting to the spar buoy, as shown in FIG. 4.

Figure 5:
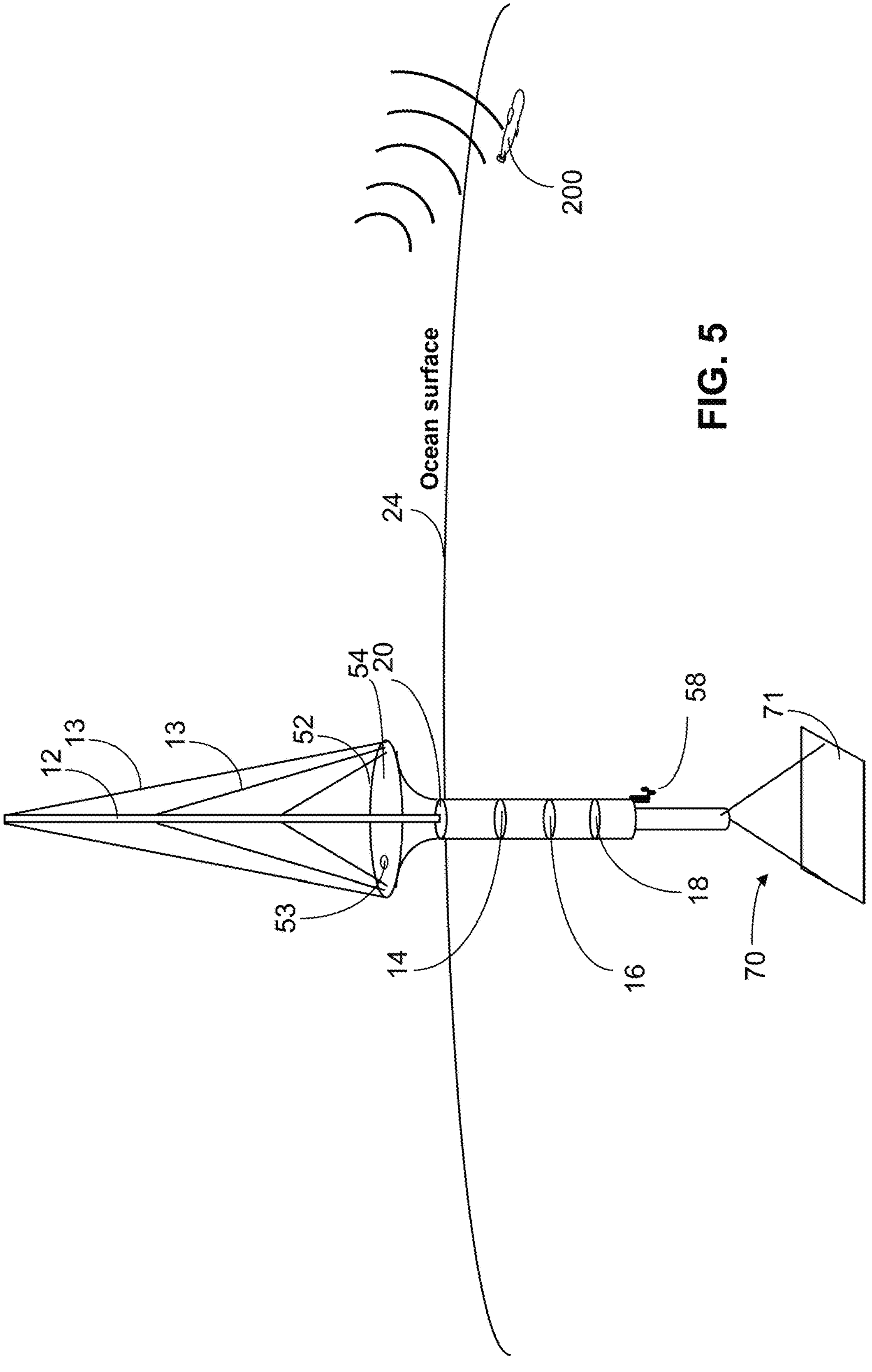
FIG. 5 shows another embodiment showing a conductive mast with guys to the mast attached to the horn, a propulsion device and a wave energy generator with a planform attached to the base in accordance with the present disclosure.

FIG. 5 shows another embodiment showing a conductive mast 12 with guys 13 attached between points on the antenna 12 and the edge of the horn 52. The guys 13 are insulated from the antenna 12 and from the horn 52, and provide additional support for the antenna 12 especially in windy conditions and ice loadings on the mast 12. Guys 13 can also be used in the configuration shown in FIG. 7 to support the added weight of the capacitively top-loaded antenna 100.

Figure 6:
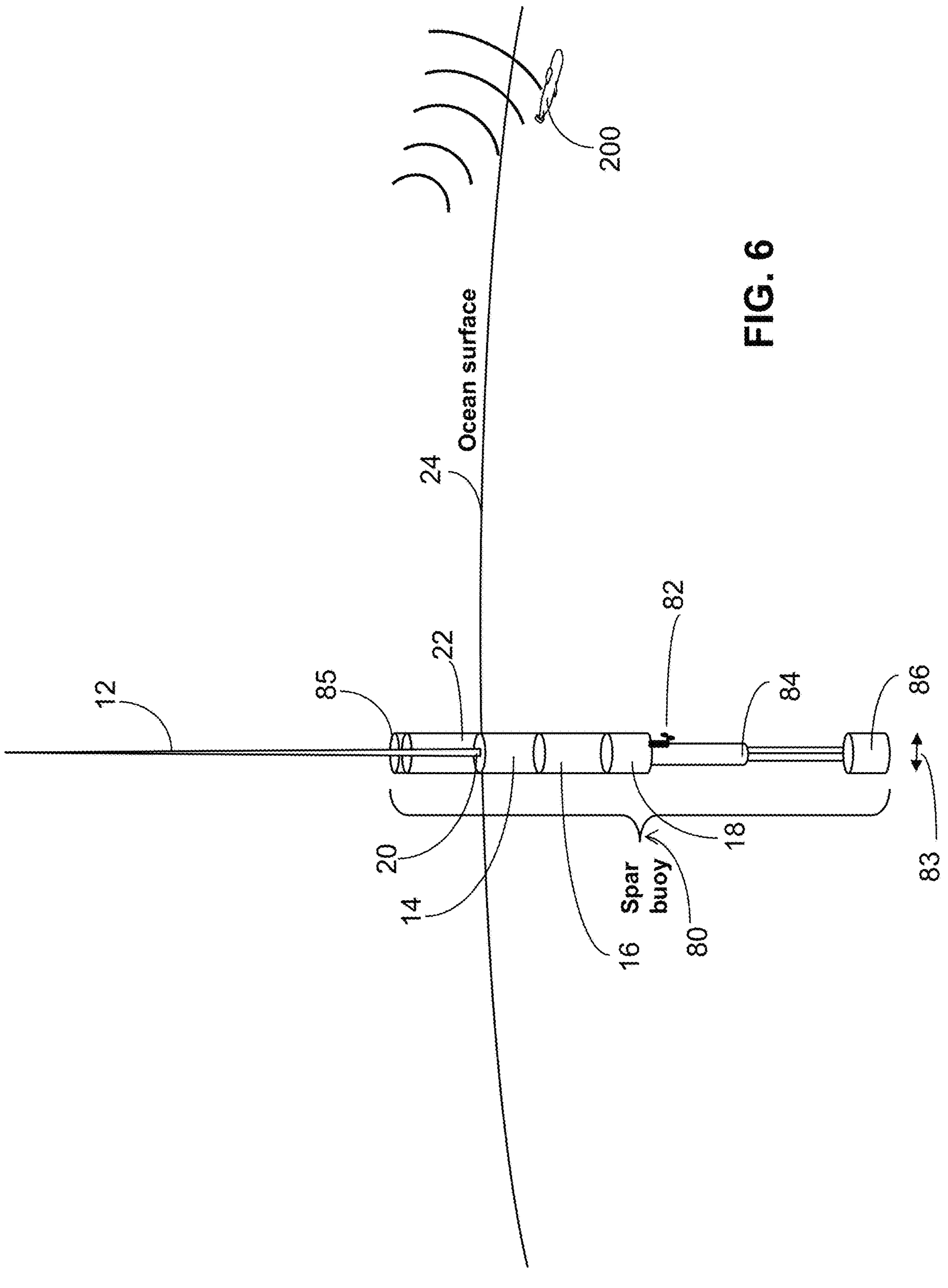
FIG. 6 shows spar buoy with an equipment and transmitter arrangement to fit within the diameter of the spar buoy for ease of packing, transport and deployment in accordance with the present disclosure.

FIG. 6 shows a preferred embodiment of the spar buoy 80 in which all the essential and any optional elements are sized to fit within a set outer diameter 83 of the spar buoy 80 for ease of packing, transport and deployment. The spar buoy 80 may be generally tubular in shape, as shown in FIG. 6. As shown in FIG. 6, in this embodiment of the spar buoy 80, the nonconductive sealing cap 85 fits over the conductive outer structure 22, and both may have a disk type shape with a diameter that is less than or equal to the set outer diameter 83 of the buoy. The spar buoy 80 may include a propulsion device 82, a wave energy converter 84, and ballast 86, as shown in FIG. 6, which are all configured to fit within the set outer diameter 83 of the spar buoy 80.

Figure 7:
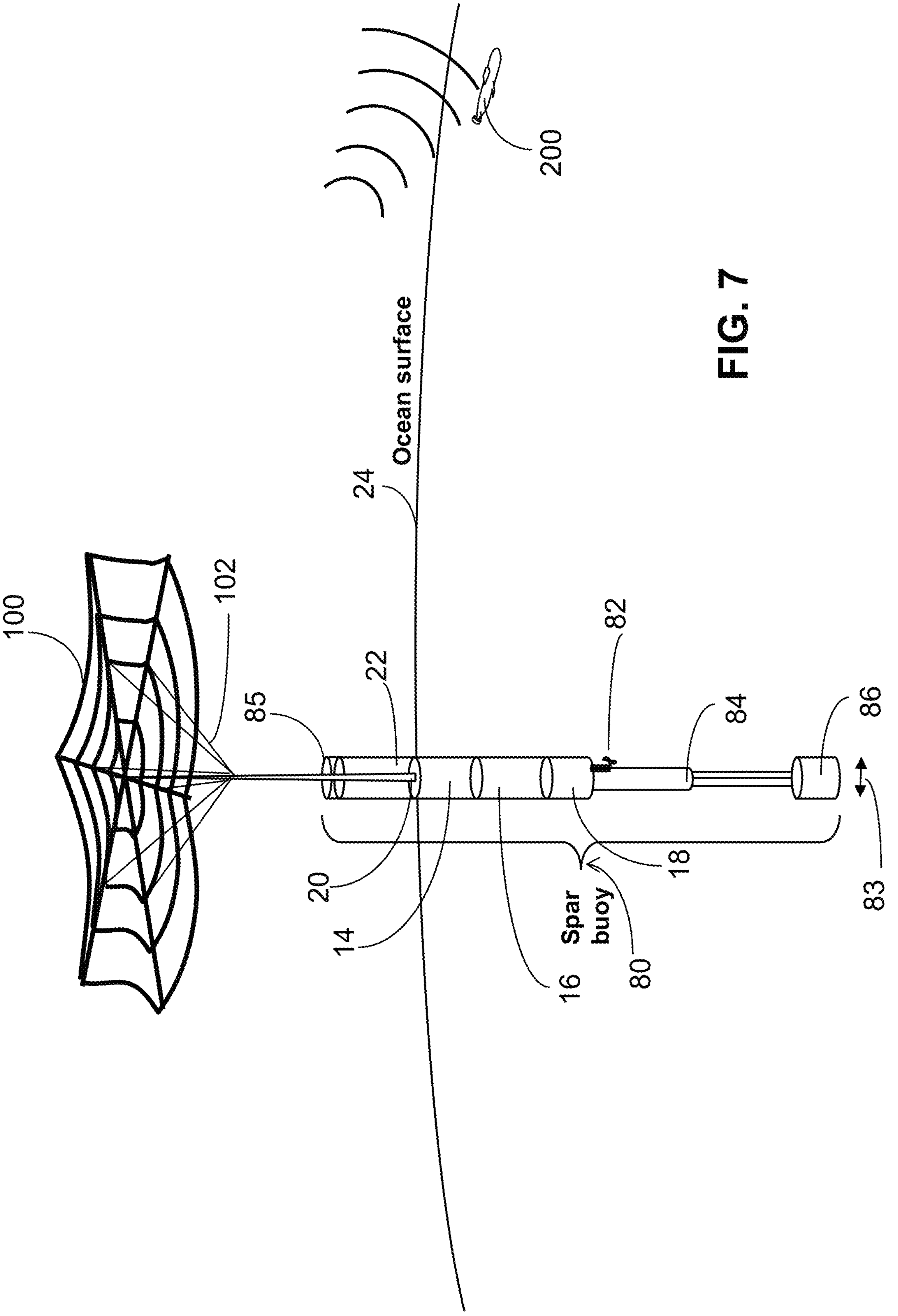
FIG. 7 shows another spar buoy with an equipment and transmitter arrangement similar to FIG. 6 with an extendable antenna that is capacitively top-loaded using support arms for deployment in accordance with the present disclosure.

FIG. 7 shows another embodiment of the spar buoy 80 in which all the essential and any optional elements are sized to fit within a set outer diameter 83 of the buoy spar 80, which may be generally tubular in shape, for ease of packing, transport and deployment. As shown in FIG. 7, this embodiment of the spar buoy 80 has a capacitively top-loaded antenna 100, which is one example of a capacitively top-loaded antenna. A capacitively top-loaded antenna may have many configurations. The capacitively top-loaded antenna 100 may be stowed within the buoy 80 and then deployed by extending antenna support arms 102. The capacitively top-loaded antenna 100 significantly decreases the required antenna height compared to configurations without a capacitively top-loaded antenna 100.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A spar buoy for very low frequency (VLF) or low frequency (LF) transmission comprising:
- a first portion of the spar buoy extending above a mean water line comprising:
- a conductive structure comprising a coaxial feed; and
- an antenna coupled to the coaxial feed and extending above the conductive structure; and
- a second portion of the spar buoy below the mean water line comprising:
- a transmitter coupled to the coaxial feed; an energy storage subsystem coupled to the transmitter; and
- an electric power generation subsystem coupled to the energy storage subsystem;
- wherein the antenna comprises a lofted antenna having a length up to 10,000 meters.

2. A system for very low frequency (VLF) or low frequency (LF) transmission comprises:
- a spar buoy;
- an air vehicle;
- a first portion of the spar buoy extending above a mean water line comprising:
  - a conductive structure comprising a coaxial feed; and
  - a conductive cable coupled to the coaxial feed and coupled to the air vehicle; and
- a second portion of the spar buoy below the mean water line comprising:
  - a transmitter coupled to the coaxial feed;
  - an energy storage subsystem coupled to the transmitter; and
  - an electric power generation subsystem coupled to the energy storage subsystem.

3. The system of claim 2 wherein the second portion of the spar buoy further comprises:
- a propulsion device coupled to the energy storage subsystem for station keeping or for repositioning the spar buoy; and
- a motion and position sensor coupled the energy storage subsystem and to the propulsion device.

4. The system of claim 2 wherein the second portion further comprises:
- control electronics coupled to the transmitter and to the energy storage subsystem; and
- communications electronics coupled to the control electronics for receiving commands and messages from a communications link or for communications with another spar buoy.

5. The system of claim 4 wherein the transmitter comprises:
- a modulator coupled to the control electronics;
- a radio frequency driver coupled to the modulator; and a matching network coupled between the RF driver and the coaxial feed.

6. The system of claim 2 wherein:
- the air vehicle comprises an autonomous airplane, a drone, a helicopter, a quadcopter, or a parafoil; and the antenna comprises a lofted antenna having a length up to 1000 m; or the air vehicle comprises an aerostat; and the antenna comprises a lofted antenna having a length up to 10,000 meters.

7. The system of claim 2 wherein the conductive cable further comprises:

a power cable coupled to the spar buoy and coupled to the air vehicle for providing power to the air vehicle; and a control cable coupled to the spar buoy and coupled to the air vehicle for providing control to the air vehicle.

8. The system of claim 2 further comprising:

an isolation transformer coupled between the transmitter and the conductive cable to isolate direct current of the transmitter from the air vehicle.

9. The system of claim 7 further comprising:

a first isolation transformer coupled to the power cable to isolate direct current on the power cable from the air vehicle; and a second isolation transformer coupled to the control cable to isolate direct current on the control cable from the air vehicle.

* * * * *